US012690515B2

(12) United States Patent
Cholst

(10) Patent No.: US 12,690,515 B2
(45) Date of Patent: Jul. 28, 2026

(54) STRING TRIMMER HEAD

(71) Applicant: MILWAUKEE ELECTRIC TOOL CORPORATION, Brookfield, WI (US)

(72) Inventor: Beth E. Cholst, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 547 days.

(21) Appl. No.: 17/855,151

(22) Filed: Jun. 30, 2022

(65) Prior Publication Data

US 2023/0000009 A1 Jan. 5, 2023

Related U.S. Application Data

(60) Provisional application No. 63/216,799, filed on Jun. 30, 2021.

(51) Int. Cl.
*A01D 34/416* (2006.01)
(52) U.S. Cl.
CPC ................................. *A01D 34/4165* (2013.01)
(58) Field of Classification Search
CPC ............ A01D 34/4165; A01D 34/4163; A01D 34/4166
USPC .......................................................... 30/276
See application file for complete search history.

(56) References Cited

U.S. PATENT DOCUMENTS

| | | | |
|---|---|---|---|
| 1,688,914 A | 10/1928 | Ariens | |
| 1,911,623 A | 5/1933 | Karl | |
| 2,020,524 A | 11/1935 | Smithburn | |
| 2,022,335 A | 11/1935 | Bernthal | |
| 2,131,324 A | 9/1938 | Hull | |
| 2,188,644 A | 1/1940 | Short | |
| D130,494 S | 11/1941 | Schmeiser | |
| 2,290,575 A | 7/1942 | Potter | |
| D137,446 S | 3/1944 | Schmeiser | |
| D138,712 S | 9/1944 | Karl | |
| 2,366,624 A | 1/1945 | Kelsey | |
| 2,366,625 A | 1/1945 | Kelsey | |
| 2,388,553 A | 11/1945 | Kraus | |
| 2,430,148 A | 11/1947 | Traver | |
| 2,438,707 A | 3/1948 | Kropp | |
| 2,455,147 A | 11/1948 | Traver | |
| 2,455,148 A | 11/1948 | Traver | |

(Continued)

FOREIGN PATENT DOCUMENTS

| | | |
|---|---|---|
| CN | 2862622 Y | 1/2007 |
| CN | 100396170 C | 6/2008 |

(Continued)

OTHER PUBLICATIONS

Translation CN-212753290-U (Year: 2026).*

(Continued)

*Primary Examiner* — Nhat Chieu Q Do
(74) *Attorney, Agent, or Firm* — Dority & Manning, P.A.

(57) ABSTRACT

A trimmer head for use with a string trimmer includes a drive shaft includes a housing rotatable about a rotational axis. The housing includes a main body defining a cavity, and a cap removably coupled to the main body. The trimmer head includes a spool supported in the cavity and operable to support line to be dispensed, a retainer positioned between the housing and the spool, and a connection member positioned within the housing and configured to drivingly couple to the drive shaft.

16 Claims, 5 Drawing Sheets

(56)                References Cited

U.S. PATENT DOCUMENTS

| | | | |
|---|---|---|---|
| 2,491,892 A | 12/1949 | Claus | |
| 2,501,364 A | 3/1950 | Traver | |
| 2,551,132 A | 5/1951 | Jacobus | |
| 2,560,359 A | 7/1951 | McCardell | |
| 2,575,223 A | 11/1951 | Madill | |
| 2,593,065 A | 4/1952 | Simon | |
| 2,595,537 A | 5/1952 | Elmer | |
| 2,603,139 A | 7/1952 | Johnson | |
| 2,614,375 A | 10/1952 | Calkins | |
| 2,614,474 A | 10/1952 | Merry | |
| 2,634,666 A | 4/1953 | Merry | |
| 2,679,794 A | 6/1954 | Ober | |
| 2,683,406 A | 7/1954 | Kelsey | |
| 2,684,022 A | 7/1954 | Smithburn | |
| 2,691,933 A | 10/1954 | Emerson | |
| 2,748,683 A | 6/1956 | Milan | |
| 2,751,833 A | 6/1956 | Glynn | |
| 2,762,073 A | 9/1956 | Lombardi | |
| 2,796,819 A | 6/1957 | Arvid | |
| 2,803,183 A | 8/1957 | Smithburn | |
| 2,812,701 A | 11/1957 | Weaver, Jr. | |
| 2,816,495 A | 12/1957 | Brooks | |
| 2,832,184 A | 4/1958 | Beuerle | |
| 2,835,182 A | 5/1958 | Smithburn | |
| 2,847,922 A | 8/1958 | Stephenson | |
| 2,847,924 A | 8/1958 | Quick | |
| 2,888,994 A | 6/1959 | Hoff et al. | |
| 2,903,077 A | 9/1959 | Igor | |
| 3,151,685 A | 10/1964 | Field | |
| 3,173,498 A | 3/1965 | Harold | |
| 3,203,487 A | 8/1965 | Whitesides | |
| 3,212,585 A | 10/1965 | Bezzerides | |
| 3,213,514 A | 10/1965 | James | |
| 3,233,685 A | 2/1966 | Brewer | |
| 3,233,686 A | 2/1966 | Steadman | |
| 3,306,371 A | 2/1967 | Bush | |
| 3,362,482 A | 1/1968 | Riddle | |
| 3,375,879 A | 4/1968 | Troyer et al. | |
| 3,397,748 A | 8/1968 | Whitesides | |
| 3,435,904 A | 4/1969 | Rice | |
| 3,442,335 A | 5/1969 | Silbereis et al. | |
| D221,461 S | 8/1971 | Hagenstad | |
| 3,605,907 A | 9/1971 | Schuring et al. | |
| 3,664,102 A | 5/1972 | Reber | |
| 3,698,485 A | 10/1972 | Trimpe et al. | |
| 3,702,638 A | 11/1972 | Takata | |
| D225,551 S | 12/1972 | Moore | |
| D225,553 S | 12/1972 | Moore | |
| 3,734,201 A | 5/1973 | Zaun | |
| 3,755,845 A | 9/1973 | Coult | |
| 3,760,884 A | 9/1973 | Webster et al. | |
| 3,781,991 A | 1/1974 | Stretton et al. | |
| 3,868,741 A | 3/1975 | Coult | |
| 3,892,278 A | 7/1975 | Smith et al. | |
| 4,006,528 A | 2/1977 | Katsuya | |
| 4,007,525 A | 2/1977 | Utter | |
| 4,043,399 A | 8/1977 | Morrison | |
| 4,043,404 A | 8/1977 | Sorlie et al. | |
| 4,044,841 A | 8/1977 | Smith et al. | |
| 4,047,299 A | 9/1977 | Bair | |
| 4,047,576 A | 9/1977 | Rau et al. | |
| 4,049,059 A | 9/1977 | Weibling | |
| 4,062,408 A | 12/1977 | Enters et al. | |
| 4,068,377 A | 1/1978 | Kimmel et al. | |
| D247,567 S | 3/1978 | Haataja | |
| 4,094,363 A | 6/1978 | McCoomb | |
| 4,095,338 A | 6/1978 | Naohiko et al. | |
| 4,097,991 A | 7/1978 | Proulx | |
| 4,098,349 A | 7/1978 | Jilani | |
| 4,100,971 A | 7/1978 | Honnold | |
| 4,113,027 A | 9/1978 | Van Der | |
| 4,118,132 A | 10/1978 | Dobberpuhl | |
| 4,133,390 A | 1/1979 | Reaume | |
| 4,151,646 A | 5/1979 | Lane | |
| 4,151,883 A | 5/1979 | Van Der et al. | |
| 4,161,820 A | 7/1979 | Moore | |
| 4,167,812 A | 9/1979 | Moore | |
| 4,168,572 A | 9/1979 | Ewing | |
| 4,183,138 A | 1/1980 | Mitchell et al. | |
| 4,189,830 A | 2/1980 | Pittinger, Jr. | |
| 4,189,833 A | 2/1980 | Kwater | |
| 4,195,408 A | 4/1980 | Palmieri et al. | |
| 4,214,632 A | 7/1980 | Brookshier | |
| 4,236,311 A | 12/1980 | Mitchell | |
| 4,237,610 A | 12/1980 | Bradus et al. | |
| 4,250,621 A | 2/1981 | Houle | |
| 4,250,622 A | 2/1981 | Houle | |
| 4,253,238 A | 3/1981 | Sheldon | |
| 4,256,183 A | 3/1981 | Hanley | |
| 4,258,635 A | 3/1981 | Lutz et al. | |
| 4,267,891 A | 5/1981 | Van Der et al. | |
| 4,269,372 A | 5/1981 | Kwater | |
| 4,271,595 A | 6/1981 | Rahe | |
| 4,274,201 A | 6/1981 | Oberg et al. | |
| 4,276,940 A | 7/1981 | Kirkegaard | |
| 4,278,133 A | 7/1981 | De Marcellus | |
| 4,290,488 A | 9/1981 | Pelsy | |
| 4,307,479 A | 12/1981 | Mertes et al. | |
| 4,346,764 A | 8/1982 | Rossi | |
| 4,347,666 A * | 9/1982 | Moore | A01D 34/4162 |
| | | | 30/276 |
| 4,349,962 A | 9/1982 | Itagaki et al. | |
| 4,362,074 A | 12/1982 | Kwater | |
| 4,364,437 A | 12/1982 | Haapala | |
| 4,372,397 A | 2/1983 | Goertzen et al. | |
| 4,373,590 A | 2/1983 | Wittrock | |
| 4,398,606 A | 8/1983 | Herscher | |
| 4,398,608 A | 8/1983 | Boetto | |
| 4,402,365 A | 9/1983 | Goertzen | |
| 4,411,322 A | 10/1983 | Linger | |
| 4,412,382 A | 11/1983 | White, III | |
| 4,412,588 A | 11/1983 | Van Der et al. | |
| 4,415,041 A | 11/1983 | Fackler | |
| 4,421,176 A | 12/1983 | Tuggle et al. | |
| 4,421,178 A | 12/1983 | Vandelli et al. | |
| 4,424,869 A | 1/1984 | Vom Braucke et al. | |
| 4,426,780 A | 1/1984 | Foster | |
| 4,458,419 A | 7/1984 | Proulx | |
| 4,467,874 A | 8/1984 | Wittrock | |
| 4,490,910 A | 1/1985 | Mattson et al. | |
| 4,492,271 A | 1/1985 | Doering | |
| 4,515,222 A | 5/1985 | Van Der | |
| 4,524,515 A | 6/1985 | Oberg | |
| 4,561,180 A | 12/1985 | Pittinger, Sr. et al. | |
| 4,611,669 A | 9/1986 | Ballard | |
| 4,629,007 A | 12/1986 | Pegoraro | |
| 4,633,588 A | 1/1987 | Pittinger, Jr. | |
| 4,646,850 A | 3/1987 | Brown et al. | |
| 4,656,739 A | 4/1987 | Pittinger, Jr. | |
| 4,658,910 A | 4/1987 | Garriss | |
| 4,660,286 A | 4/1987 | Engelbrecht et al. | |
| 4,672,798 A | 6/1987 | Ota | |
| 4,678,043 A | 7/1987 | Vom Braucke et al. | |
| 4,702,005 A | 10/1987 | Pittinger, Sr. et al. | |
| 4,706,761 A | 11/1987 | Herscher et al. | |
| D293,342 S | 12/1987 | Thomson et al. | |
| 4,736,573 A | 4/1988 | Seck et al. | |
| 4,744,148 A | 5/1988 | Brown | |
| 4,776,290 A | 10/1988 | Rau et al. | |
| 4,776,405 A | 10/1988 | Grieder et al. | |
| D300,141 S | 3/1989 | Kawashima | |
| 4,817,732 A | 4/1989 | Brown | |
| 4,871,031 A | 10/1989 | Kestel | |
| 4,882,843 A | 11/1989 | Baba | |
| 4,888,871 A | 12/1989 | Engelbrecht | |
| 4,942,664 A | 7/1990 | Zatulovsky | |
| 5,010,720 A | 4/1991 | Corsi | |
| 5,025,615 A | 6/1991 | Hawkenson | |
| 5,029,361 A | 7/1991 | Murata et al. | |
| 5,033,259 A | 7/1991 | Adcock | |
| 5,048,616 A | 9/1991 | Hoff, deceased | |
| 5,056,181 A | 10/1991 | Tsuchiya et al. | |
| 5,063,673 A * | 11/1991 | Webster | A01D 34/4162 |
| | | | 30/276 |

(56)                References Cited

U.S. PATENT DOCUMENTS

| | | | |
|---|---|---|---|
| 5,063,731 A | 11/1991 | Hull et al. |
| 5,082,063 A | 1/1992 | Sidders |
| 5,109,976 A | 5/1992 | Mohri et al. |
| 5,136,782 A | 8/1992 | Calcinai |
| 5,148,569 A | 9/1992 | Jailor et al. |
| 5,158,145 A | 10/1992 | Karchewski |
| 5,159,845 A | 11/1992 | Wada et al. |
| 5,224,553 A | 7/1993 | Heintzman |
| 5,267,517 A | 12/1993 | Jones |
| 5,299,647 A | 4/1994 | Mudd et al. |
| 5,339,526 A | 8/1994 | Everts |
| 5,351,565 A | 10/1994 | Wada et al. |
| 5,361,570 A | 11/1994 | Bernardy |
| 5,375,284 A | 12/1994 | Deimel et al. |
| 5,394,612 A | 3/1995 | Wolfington |
| 5,443,023 A | 8/1995 | Carroll |
| 5,507,351 A | 4/1996 | Martin |
| 5,524,349 A | 6/1996 | Dolin |
| 5,645,000 A | 7/1997 | Carroll |
| 5,662,173 A | 9/1997 | Blesing |
| 5,765,287 A | 6/1998 | Griffini et al. |
| 5,806,294 A | 9/1998 | Strieber |
| 5,810,093 A | 9/1998 | Howard |
| 5,850,882 A | 12/1998 | Link |
| 5,855,068 A | 1/1999 | Zilly et al. |
| 5,875,700 A | 3/1999 | Powell |
| 5,931,605 A | 8/1999 | Toor et al. |
| 5,950,317 A | 9/1999 | Yates et al. |
| 5,960,889 A | 10/1999 | Mclaren |
| 5,996,234 A | 12/1999 | Fowler et al. |
| 6,017,169 A | 1/2000 | Toor et al. |
| D421,026 S | 2/2000 | Bruns et al. |
| 6,021,630 A | 2/2000 | Higashi et al. |
| 6,052,976 A | 4/2000 | Cellini et al. |
| 6,065,214 A | 5/2000 | Nagashima |
| 6,167,973 B1 | 1/2001 | Nagashima |
| 6,272,756 B1 | 8/2001 | Peterson et al. |
| 6,293,349 B1 | 9/2001 | Marshall et al. |
| 6,311,398 B1 | 11/2001 | Peterson et al. |
| 6,364,030 B1 | 4/2002 | Pfeiffer et al. |
| 6,367,561 B1 | 4/2002 | Firdaus |
| 6,422,194 B2 | 7/2002 | Ito et al. |
| 6,446,346 B1 | 9/2002 | Castleman |
| D467,944 S | 12/2002 | Stark |
| 6,487,780 B1 | 12/2002 | Peterson et al. |
| 6,488,101 B1 | 12/2002 | Miyahara et al. |
| 6,494,176 B2 | 12/2002 | Ito et al. |
| 6,497,044 B2 | 12/2002 | Yamane et al. |
| D469,447 S | 1/2003 | Stark |
| 6,505,596 B2 | 1/2003 | Ito et al. |
| 6,508,224 B2 | 1/2003 | Ito et al. |
| 6,519,857 B1 | 2/2003 | Proulx et al. |
| 6,523,618 B2 | 2/2003 | Firdaus |
| 6,540,031 B1 | 4/2003 | Sasaoka |
| 6,578,270 B2 | 6/2003 | Hiratsuna et al. |
| 6,594,907 B2 | 7/2003 | Wilson et al. |
| 6,612,376 B2 | 9/2003 | Sergyeyenko et al. |
| 6,640,449 B1 | 11/2003 | Hoffmann et al. |
| 6,644,416 B2 | 11/2003 | Teeple |
| 6,666,009 B1 | 12/2003 | Brandon |
| 6,672,273 B2 | 1/2004 | Ito et al. |
| 6,705,263 B2 | 3/2004 | Ito et al. |
| 6,708,774 B2 | 3/2004 | Miyahara et al. |
| 6,722,041 B2 | 4/2004 | Warashina et al. |
| 6,739,058 B2 | 5/2004 | Warashina et al. |
| 6,739,403 B2 | 5/2004 | Firdaus |
| 6,754,962 B2 | 6/2004 | Warashina et al. |
| 6,754,963 B2 | 6/2004 | Warashina et al. |
| 6,754,964 B2 | 6/2004 | Sugihara et al. |
| 6,757,980 B2 | 7/2004 | Arsenault |
| 6,766,866 B2 | 7/2004 | Miyahara et al. |
| 6,779,274 B2 | 8/2004 | Peterson et al. |
| 6,782,863 B2 | 8/2004 | Leasure et al. |
| 6,810,849 B1 | 11/2004 | Hirsch et al. |
| 6,823,947 B2 | 11/2004 | Nagaoka et al. |
| 6,834,633 B2 | 12/2004 | Sing et al. |
| 6,854,525 B2 | 2/2005 | Martindale |
| D503,938 S | 4/2005 | Vasilescu |
| 6,904,977 B2 | 6/2005 | Zerrer et al. |
| 6,926,090 B2 | 8/2005 | Sergyeyenko et al. |
| 6,926,091 B2 | 8/2005 | Lee |
| 6,938,587 B2 | 9/2005 | Thomas et al. |
| 6,944,954 B1 | 9/2005 | Arnetoli |
| 6,952,877 B2 | 10/2005 | Pfaltzgraff |
| 6,997,812 B2 | 2/2006 | Sasaki et al. |
| 7,000,324 B2 | 2/2006 | Fogle |
| 7,017,272 B2 | 3/2006 | Grace |
| D518,831 S | 4/2006 | Bowsher |
| D519,526 S | 4/2006 | Bowsher |
| D523,028 S | 6/2006 | Fitzpatrick |
| 7,059,106 B2 | 6/2006 | Brandon |
| 7,096,966 B2 | 8/2006 | Eberhardt et al. |
| 7,171,723 B2 | 2/2007 | Kobayashi et al. |
| 7,171,798 B1 | 2/2007 | Bernardy |
| 7,251,857 B2 | 8/2007 | Caruso |
| 7,275,324 B2 | 10/2007 | Proulx |
| 7,302,790 B2 | 12/2007 | Brandon |
| 7,303,025 B2 | 12/2007 | Mayer |
| 7,395,601 B2 | 7/2008 | Berfield |
| 7,412,768 B2 | 8/2008 | Alliss |
| 7,480,998 B2 | 1/2009 | Suzuki et al. |
| 7,484,568 B2 | 2/2009 | Vasilescu |
| 7,513,046 B2 | 4/2009 | Proulx |
| D598,255 S | 8/2009 | Alliss |
| 7,575,066 B2 | 8/2009 | Bauer |
| 7,581,322 B2 | 9/2009 | Proulx |
| 7,594,334 B2 | 9/2009 | Kocha |
| 7,607,232 B2 | 10/2009 | Pfaltzgraff |
| D607,017 S | 12/2009 | Fraley et al. |
| 7,624,814 B2 | 12/2009 | Skolness |
| 7,640,668 B2 | 1/2010 | Iacona |
| 7,640,995 B2 | 1/2010 | Knobloch |
| 7,661,252 B2 | 2/2010 | Kitamura |
| D611,507 S | 3/2010 | Martin |
| 7,753,133 B2 | 7/2010 | Skolness |
| 7,762,002 B2 | 7/2010 | Proulx |
| 7,797,839 B2 | 9/2010 | Proulx |
| 7,814,984 B1 | 10/2010 | Fraley et al. |
| 7,878,260 B2 | 2/2011 | Notaras et al. |
| 7,882,642 B2 | 2/2011 | Proulx |
| 7,963,344 B2 | 6/2011 | Marcil et al. |
| 7,979,991 B2 | 7/2011 | Pfaltzgraff |
| 7,984,573 B2 | 7/2011 | Lau |
| 8,001,694 B2 | 8/2011 | Sing et al. |
| 8,025,249 B2 | 9/2011 | Alliss et al. |
| 8,122,554 B2 | 2/2012 | Schemmel et al. |
| 8,162,072 B2 | 4/2012 | Marcil et al. |
| 8,181,711 B1 | 5/2012 | Fraley et al. |
| 8,186,450 B2 | 5/2012 | Bauer |
| 8,210,272 B2 | 7/2012 | Notaras et al. |
| 8,230,602 B2 | 7/2012 | Arnetoli |
| 8,261,846 B2 | 9/2012 | Fraley et al. |
| 8,266,805 B1 | 9/2012 | Alliss |
| 8,297,034 B1 | 10/2012 | Mueller |
| 8,327,947 B2 | 12/2012 | Martindale et al. |
| 8,347,443 B1 | 1/2013 | Conrad |
| 8,429,886 B2 | 4/2013 | Kato et al. |
| 8,434,563 B2 | 5/2013 | Gendelman et al. |
| 8,464,431 B2 | 6/2013 | Reynolds et al. |
| 8,496,069 B2 | 7/2013 | Gendelman et al. |
| 8,496,071 B2 | 7/2013 | Fraley et al. |
| 8,510,960 B2 | 8/2013 | Pfaltzgraff et al. |
| D690,063 S | 9/2013 | Kent et al. |
| 8,549,827 B2 | 10/2013 | Kato et al. |
| 8,567,073 B2 | 10/2013 | Proulx |
| 8,567,074 B2 | 10/2013 | Arnetoli |
| 8,568,051 B2 | 10/2013 | Burnett |
| 8,607,889 B2 | 12/2013 | Marcil et al. |
| 8,615,887 B2 | 12/2013 | Arnetoli |
| 8,627,897 B2 | 1/2014 | Marcil et al. |
| 8,627,898 B2 | 1/2014 | Nance |
| 8,701,621 B2 | 4/2014 | Takeda et al. |
| 8,707,567 B2 | 4/2014 | Proulx |
| 8,745,879 B2 | 6/2014 | Alliss |

(56) References Cited

U.S. PATENT DOCUMENTS

| | | | |
|---|---|---|---|
| 8,745,880 B2 | 6/2014 | Kato | |
| 8,776,910 B1 | 7/2014 | Dallas et al. | |
| D718,345 S | 11/2014 | Whalen | |
| 8,910,387 B2 | 12/2014 | Alliss | |
| 8,910,388 B2 | 12/2014 | Proulx | |
| 8,915,219 B2 | 12/2014 | Nakamura et al. | |
| 8,918,999 B2 | 12/2014 | Proulx et al. | |
| 8,928,201 B2 | 1/2015 | Tanimoto et al. | |
| 8,991,514 B2 | 3/2015 | Tozawa et al. | |
| 9,041,320 B2 | 5/2015 | Untermann et al. | |
| 9,049,816 B2 | 6/2015 | Ito et al. | |
| 9,095,098 B2 | 8/2015 | Guenther et al. | |
| 9,144,194 B2 | 9/2015 | Kato | |
| 9,160,211 B2 | 10/2015 | Tanimoto et al. | |
| 9,167,737 B2 | 10/2015 | McGowen | |
| D745,759 S | 12/2015 | Kent et al. | |
| 9,204,588 B1 | 12/2015 | Christie et al. | |
| 9,224,995 B2 | 12/2015 | Martinsson et al. | |
| 9,271,442 B2 | 3/2016 | Pellenc | |
| 9,277,687 B2 | 3/2016 | Marcil et al. | |
| 9,290,905 B1 | 3/2016 | Diaz et al. | |
| 9,295,195 B2 | 3/2016 | Proulx et al. | |
| 9,307,687 B2 | 4/2016 | Ruppel et al. | |
| 9,320,189 B2 | 4/2016 | Nance | |
| 9,322,344 B2 | 4/2016 | Isono et al. | |
| 9,345,193 B2 | 5/2016 | Wu | |
| 9,357,712 B2 | 6/2016 | Pickett et al. | |
| 9,363,946 B2 | 6/2016 | Pellenc | |
| 9,366,220 B2 | 6/2016 | Leufen et al. | |
| 9,380,743 B2 | 7/2016 | Alliss | |
| 9,392,737 B2 | 7/2016 | Sanderson | |
| 9,439,339 B2 | 9/2016 | Hurd | |
| 9,447,827 B2 | 9/2016 | Yuasa | |
| 9,456,723 B2 | 10/2016 | Thorne et al. | |
| 9,468,143 B2 | 10/2016 | Stark | |
| 9,496,809 B2 | 11/2016 | Nakano et al. | |
| 9,516,799 B2 | 12/2016 | Olsen | |
| 9,516,807 B2 | 12/2016 | Alliss | |
| 9,526,389 B2 | 12/2016 | Thorne et al. | |
| 9,655,486 B2 | 5/2017 | Xu et al. | |
| 9,670,837 B2 | 6/2017 | Honzawa et al. | |
| 9,730,371 B2 | 8/2017 | Ruppel et al. | |
| 9,736,974 B2 | 8/2017 | Hurd | |
| D796,559 S | 9/2017 | Bruce | |
| 9,752,630 B2 | 9/2017 | Yuasa | |
| 9,756,783 B2 | 9/2017 | Nojiri et al. | |
| 9,763,372 B2 | 9/2017 | Modzik et al. | |
| 9,782,884 B2 | 10/2017 | Ota et al. | |
| 9,826,679 B2 | 11/2017 | Lang et al. | |
| 9,839,172 B2 | 12/2017 | Meier et al. | |
| 9,844,189 B2 | 12/2017 | Baker | |
| 9,844,307 B2 | 12/2017 | Muir | |
| 9,854,738 B2 | 1/2018 | Miller et al. | |
| 9,861,033 B2 | 1/2018 | Skinner et al. | |
| 9,872,429 B2 | 1/2018 | Ma et al. | |
| 9,877,435 B2 | 1/2018 | Li et al. | |
| 9,907,234 B2 | 3/2018 | Poole et al. | |
| 9,924,631 B2 | 3/2018 | Alliss | |
| 9,955,627 B2 | 5/2018 | Nakano et al. | |
| 9,955,832 B2 | 5/2018 | Thorne et al. | |
| D825,293 S | 8/2018 | Alliss | |
| 10,051,772 B2 | 8/2018 | Freed et al. | |
| 10,064,329 B1 | 9/2018 | Lovmark | |
| 10,105,832 B2 | 10/2018 | Martinsson et al. | |
| 10,130,030 B2 | 11/2018 | Sprungman et al. | |
| 10,149,433 B2 * | 12/2018 | Wyne ............... A01D 34/685 | |
| 10,159,171 B1 | 12/2018 | Christie et al. | |
| D838,811 S | 1/2019 | Kornblum | |
| 10,226,157 B2 | 3/2019 | Xu et al. | |
| 10,247,165 B2 | 4/2019 | Eto et al. | |
| 10,264,725 B2 | 4/2019 | Guo et al. | |
| 10,273,112 B2 | 4/2019 | Alliss | |
| 10,278,321 B2 | 5/2019 | Parkey | |
| 10,299,430 B2 | 5/2019 | Miller et al. | |
| 10,314,228 B2 | 6/2019 | Ma et al. | |
| 10,314,229 B2 | 6/2019 | Arnetoli | |
| 10,327,381 B2 | 6/2019 | Arnetoli | |
| 10,334,778 B2 | 7/2019 | Kullberg | |
| 10,334,779 B2 | 7/2019 | Kågebäck et al. | |
| 10,350,743 B2 | 7/2019 | Fu et al. | |
| 10,362,721 B2 | 7/2019 | Hurd | |
| 10,371,044 B2 | 8/2019 | Karrar | |
| 10,390,471 B2 | 8/2019 | Bruce | |
| 10,398,071 B2 | 9/2019 | Ruppel et al. | |
| 10,433,491 B2 | 10/2019 | Li et al. | |
| 10,439,415 B2 | 10/2019 | Zhu et al. | |
| 10,440,882 B2 | 10/2019 | Guo et al. | |
| 10,506,754 B2 | 12/2019 | Christie et al. | |
| 10,517,209 B2 | 12/2019 | Kullberg | |
| 10,517,210 B2 | 12/2019 | Cabrera | |
| 10,517,385 B2 | 12/2019 | Kress | |
| 10,537,057 B2 | 1/2020 | Sergyeyenko et al. | |
| D878,430 S | 3/2020 | Bruce | |
| D878,431 S | 3/2020 | Bruce | |
| 10,575,472 B2 | 3/2020 | Baker | |
| 10,638,666 B2 | 5/2020 | Fu | |
| 10,645,878 B2 | 5/2020 | Zhang et al. | |
| 10,645,884 B2 | 5/2020 | Poole et al. | |
| RE48,068 E | 6/2020 | Nojiri et al. | |
| 10,716,253 B2 | 7/2020 | Zenkus et al. | |
| 10,722,023 B2 | 7/2020 | Zhai | |
| 10,772,258 B2 | 9/2020 | Sugiyama | |
| 10,820,462 B2 | 11/2020 | Christie et al. | |
| 10,820,685 B1 | 11/2020 | Becker | |
| 10,856,466 B2 | 12/2020 | Guo et al. | |
| 2002/0026714 A1 | 3/2002 | Peterson et al. | |
| 2002/0073556 A1 | 6/2002 | Fogle | |
| 2002/0144408 A1 | 10/2002 | Cho | |
| 2002/0189107 A1 | 12/2002 | Arnetoli | |
| 2004/0065289 A1 | 4/2004 | Leasure et al. | |
| 2004/0123828 A1 | 7/2004 | Sing et al. | |
| 2004/0128840 A1 | 7/2004 | Proulx et al. | |
| 2004/0148784 A1 | 8/2004 | Grace | |
| 2004/0149466 A1 | 8/2004 | Stark | |
| 2004/0154276 A1 | 8/2004 | Brandon | |
| 2004/0255895 A1 | 12/2004 | Hirsch et al. | |
| 2005/0045347 A1 | 3/2005 | Stark et al. | |
| 2005/0167125 A1 | 8/2005 | Martindale | |
| 2005/0183411 A1 | 8/2005 | Stanley | |
| 2005/0252184 A1 | 11/2005 | Craig | |
| 2005/0274532 A1 | 12/2005 | Lephart et al. | |
| 2006/0053636 A1 | 3/2006 | Fogle | |
| 2006/0070753 A1 | 4/2006 | Lephart et al. | |
| 2006/0124324 A1 | 6/2006 | Neusink et al. | |
| 2006/0191143 A1 | 8/2006 | Brandon | |
| 2006/0254061 A1 | 11/2006 | Alliss | |
| 2007/0180704 A1 | 8/2007 | Chiu | |
| 2007/0180705 A1 | 8/2007 | Chiu | |
| 2007/0287571 A1 | 12/2007 | Li | |
| 2008/0022484 A1 | 1/2008 | Caruso | |
| 2008/0128147 A1 | 6/2008 | Lynch | |
| 2008/0201877 A1 | 8/2008 | Sengewald et al. | |
| 2008/0236851 A1 | 10/2008 | Winkle | |
| 2008/0282554 A1 | 11/2008 | Grace | |
| 2009/0044351 A1 | 2/2009 | Menrik et al. | |
| 2009/0050341 A1 | 2/2009 | Hathaway et al. | |
| 2009/0173053 A1 | 7/2009 | Stanley | |
| 2010/0154229 A1 | 6/2010 | Iacona et al. | |
| 2010/0186240 A1 | 7/2010 | Waugh | |
| 2010/0229403 A1 | 9/2010 | Apfel et al. | |
| 2011/0131817 A1 | 6/2011 | Ito | |
| 2011/0239468 A1 | 10/2011 | Conlon | |
| 2011/0240319 A1 | 10/2011 | Sanderson | |
| 2011/0297404 A1 | 12/2011 | Welch | |
| 2011/0302791 A1 | 12/2011 | Proulx et al. | |
| 2011/0302898 A1 | 12/2011 | Craig | |
| 2012/0073258 A1 | 3/2012 | Stanley | |
| 2012/0104983 A1 | 5/2012 | Tanimoto et al. | |
| 2012/0159792 A1 | 6/2012 | Hoelscher | |
| 2012/0198706 A1 | 8/2012 | Yang et al. | |
| 2012/0234122 A1 | 9/2012 | Naka | |
| 2012/0279743 A1 | 11/2012 | Suda et al. | |
| 2013/0014996 A1 | 1/2013 | Ruppel et al. | |
| 2013/0049477 A1 | 2/2013 | Tozawa et al. | |

(56) References Cited

U.S. PATENT DOCUMENTS

| | | |
|---|---|---|
| 2013/0133903 A1 | 5/2013 | Lipscomb |
| 2013/0180547 A1 | 7/2013 | Kent et al. |
| 2013/0185946 A1 | 7/2013 | Apfel et al. |
| 2014/0053416 A1 | 2/2014 | Proulx |
| 2014/0083375 A1 | 3/2014 | Kawashima et al. |
| 2014/0345893 A1 | 11/2014 | Christie et al. |
| 2015/0068783 A1 | 3/2015 | Pickett et al. |
| 2015/0075010 A1 | 3/2015 | Proulx |
| 2015/0107120 A1 | 4/2015 | Proulx et al. |
| 2016/0007520 A1 | 1/2016 | McGowen |
| 2016/0021818 A1 | 1/2016 | Salsbery |
| 2016/0106034 A1 | 4/2016 | Arnetoli |
| 2016/0128276 A1 | 5/2016 | Arnetoli |
| 2016/0143218 A1 | 5/2016 | Sergyeyenko et al. |
| 2016/0183452 A1 | 6/2016 | Kullberg |
| 2016/0271783 A1 | 9/2016 | Pickett et al. |
| 2016/0305438 A1 | 10/2016 | Yamamoto et al. |
| 2017/0034984 A1 | 2/2017 | Olsen |
| 2017/0094900 A1 | 4/2017 | Arnetoli |
| 2017/0349394 A1 | 12/2017 | Alliss |
| 2018/0020614 A1 | 1/2018 | Alliss |
| 2018/0020615 A1 | 1/2018 | Alliss |
| 2018/0094393 A1 | 4/2018 | Takahashi et al. |
| 2018/0110182 A1 | 4/2018 | Nolin et al. |
| 2018/0116106 A1 | 5/2018 | Kullberg et al. |
| 2018/0132417 A1 | 5/2018 | Alliss |
| 2018/0168098 A1 | 6/2018 | Alliss |
| 2018/0177122 A1 | 6/2018 | Skinner |
| 2018/0263184 A1 | 9/2018 | Cline |
| 2018/0294656 A1 | 10/2018 | Iwata et al. |
| 2018/0325035 A1 | 11/2018 | Chung et al. |
| 2018/0333753 A1 | 11/2018 | Nolin et al. |
| 2019/0059213 A1 | 2/2019 | Sprungman et al. |
| 2019/0075721 A1* | 3/2019 | Cholst ............... A01D 34/4166 |
| 2019/0109478 A1 | 4/2019 | Zhu et al. |
| 2019/0116714 A1 | 4/2019 | Christie et al. |
| 2019/0116728 A1 | 4/2019 | Zenkus et al. |
| 2019/0185289 A1 | 6/2019 | Alliss |
| 2019/0216013 A1 | 7/2019 | Guo et al. |
| 2019/0261549 A1 | 8/2019 | Christie et al. |
| 2019/0261557 A1 | 8/2019 | Ma et al. |
| 2019/0269289 A1 | 9/2019 | Xu et al. |
| 2019/0274500 A1 | 9/2019 | Thorne et al. |
| 2019/0320865 A1 | 10/2019 | Brown et al. |
| 2019/0341794 A1 | 11/2019 | Zhu et al. |
| 2020/0008348 A1 | 1/2020 | Guo et al. |
| 2020/0029497 A1 | 1/2020 | Guo et al. |
| 2020/0030958 A1 | 1/2020 | Chan |
| 2020/0053940 A1 | 2/2020 | Ruppel et al. |
| 2020/0067337 A1 | 2/2020 | Nakamoto et al. |
| 2020/0079614 A1 | 3/2020 | Cigarini et al. |
| 2020/0113131 A1 | 4/2020 | Arnetoli |
| 2020/0129031 A1 | 4/2020 | Kress |
| 2020/0137965 A1 | 5/2020 | Register |
| 2020/0138179 A1 | 5/2020 | Keiser et al. |
| 2020/0139514 A1 | 5/2020 | Clifford et al. |
| 2020/0196533 A1 | 6/2020 | Wu et al. |
| 2020/0198097 A1 | 6/2020 | Keiser et al. |
| 2020/0212837 A1 | 7/2020 | Ichikawa et al. |
| 2020/0212838 A1 | 7/2020 | Nakamoto et al. |
| 2020/0236845 A1 | 7/2020 | Wang et al. |
| 2020/0236848 A1 | 7/2020 | Guo et al. |
| 2020/0236875 A1 | 7/2020 | Poole et al. |
| 2020/0246998 A1 | 8/2020 | Niiyama |
| 2020/0260643 A1 | 8/2020 | Hata et al. |
| 2020/0267902 A1 | 8/2020 | Zhang et al. |
| 2020/0296888 A1 | 9/2020 | Arnetoli |
| 2020/0315089 A1 | 10/2020 | Racz et al. |
| 2021/0015035 A1 | 1/2021 | Guo et al. |
| 2022/0304223 A1* | 9/2022 | Tabor ............... A01D 34/4165 |
| 2022/0330479 A1 | 10/2022 | Cholst et al. |
| 2023/0000008 A1 | 1/2023 | Cholst |
| 2023/0000010 A1 | 1/2023 | Cholst et al. |
| 2023/0000011 A1 | 1/2023 | Cholst et al. |

FOREIGN PATENT DOCUMENTS

| | | |
|---|---|---|
| CN | 201222848 Y | 4/2009 |
| CN | 201450714 U | 5/2010 |
| CN | 201541438 U | 8/2010 |
| CN | 201645232 U | 11/2010 |
| CN | 201839620 U | 5/2011 |
| CN | 102349367 A | 2/2012 |
| CN | 102369810 A | 3/2012 |
| CN | 102388688 A | 3/2012 |
| CN | 202262256 U | 6/2012 |
| CN | 202617619 U | 12/2012 |
| CN | 202818968 U | 3/2013 |
| CN | 202998783 U | 6/2013 |
| CN | 203120459 U | 8/2013 |
| CN | 103299835 A | 9/2013 |
| CN | 203181557 U | 9/2013 |
| CN | 203206734 U | 9/2013 |
| CN | 103404309 A | 11/2013 |
| CN | 203301952 U | 11/2013 |
| CN | 103430687 A | 12/2013 |
| CN | 203435367 U | 2/2014 |
| CN | 203504961 U | 4/2014 |
| CN | 104115609 A | 10/2014 |
| CN | 204069639 U | 1/2015 |
| CN | 204206729 U | 3/2015 |
| CN | 104663026 A | 6/2015 |
| CN | 104782247 A | 7/2015 |
| CN | 104823538 A | 8/2015 |
| CN | 204560136 U | 8/2015 |
| CN | 103548434 B | 9/2015 |
| CN | 204707415 U | 10/2015 |
| CN | 204724895 U | 10/2015 |
| CN | 105052356 A | 11/2015 |
| CN | 204761980 U | 11/2015 |
| CN | 204948761 U | 1/2016 |
| CN | 105284270 A | 2/2016 |
| CN | 105359707 A | 3/2016 |
| CN | 105393695 A | 3/2016 |
| CN | 105393696 A | 3/2016 |
| CN | 205105540 U | 3/2016 |
| CN | 103286393 B | 4/2016 |
| CN | 105507806 A | 4/2016 |
| CN | 205142981 U | 4/2016 |
| CN | 105594362 A | 5/2016 |
| CN | 205232795 U | 5/2016 |
| CN | 205232798 U | 5/2016 |
| CN | 105794342 A | 7/2016 |
| CN | 205357121 U | 7/2016 |
| CN | 205399324 U | 7/2016 |
| CN | 105874918 A | 8/2016 |
| CN | 105874921 A | 8/2016 |
| CN | 205430100 U | 8/2016 |
| CN | 103404294 B | 9/2016 |
| CN | 106235967 A | 12/2016 |
| CN | 106416464 A | 2/2017 |
| CN | 205961825 U | 2/2017 |
| CN | 206007154 U | 3/2017 |
| CN | 104885608 B | 4/2017 |
| CN | 105493662 B | 6/2017 |
| CN | 206251578 U | 6/2017 |
| CN | 106922226 A | 7/2017 |
| CN | 206423136 U | 8/2017 |
| CN | 206547259 U | 10/2017 |
| CN | 107371404 A | 11/2017 |
| CN | 206658380 U | 11/2017 |
| CN | 206743789 U | 12/2017 |
| CN | 206776065 U | 12/2017 |
| CN | 207040310 U | 2/2018 |
| CN | 105612905 B | 3/2018 |
| CN | 207235369 U | 4/2018 |
| CN | 207382811 U | 5/2018 |
| CN | 105917763 B | 6/2018 |
| CN | 207444904 U | 6/2018 |
| CN | 207505355 U | 6/2018 |
| CN | 108450064 A | 8/2018 |
| CN | 108575123 A | 9/2018 |
| CN | 207869611 U | 9/2018 |
| CN | 207869613 U | 9/2018 |

(56) References Cited

FOREIGN PATENT DOCUMENTS

| | | | |
|---|---|---|---|
| CN | 108901311 A | 11/2018 |
| CN | 208079682 U | 11/2018 |
| CN | 208175262 U | 12/2018 |
| CN | 208227601 U | 12/2018 |
| CN | 106034412 B | 1/2019 |
| CN | 208338368 U | 1/2019 |
| CN | 208353830 U | 1/2019 |
| CN | 208387296 U | 1/2019 |
| CN | 109417934 A | 3/2019 |
| CN | 106941788 B | 4/2019 |
| CN | 208708144 U | 4/2019 |
| CN | 208783289 U | 4/2019 |
| CN | 208987318 U | 6/2019 |
| CN | 208987320 U | 6/2019 |
| CN | 208987321 U | 6/2019 |
| CN | 208987324 U | 6/2019 |
| CN | 209057530 U | 7/2019 |
| CN | 209151588 U | 7/2019 |
| CN | 209170912 U | 7/2019 |
| CN | 209201539 U | 8/2019 |
| CN | 209358935 U | 9/2019 |
| CN | 209359016 U | 9/2019 |
| CN | 110291882 A | 10/2019 |
| CN | 110352693 A | 10/2019 |
| CN | 209609119 U | 11/2019 |
| CN | 110557981 A | 12/2019 |
| CN | 209749148 U | 12/2019 |
| CN | 209787751 U | 12/2019 |
| CN | 110679211 A | 1/2020 |
| CN | 209930839 U | 1/2020 |
| CN | 110810044 A | 2/2020 |
| CN | 210168414 U | 3/2020 |
| CN | 111010893 A | 4/2020 |
| CN | 210470200 U | 5/2020 |
| CN | 210580046 U | 5/2020 |
| CN | 109845430 B | 6/2020 |
| CN | 210726020 U | 6/2020 |
| CN | 210781975 U | 6/2020 |
| CN | 211047783 U | 7/2020 |
| CN | 211047784 U | 7/2020 |
| CN | 211152632 U | 8/2020 |
| CN | 211210519 U | 8/2020 |
| CN | 211240702 U | 8/2020 |
| CN | 111615871 A | 9/2020 |
| CN | 111623093 A | 9/2020 |
| CN | 211378812 U | 9/2020 |
| CN | 211457896 U | 9/2020 |
| CN | 105284209 B | 10/2020 |
| CN | 109077437 B | 11/2020 |
| CN | 212753290 U * | 3/2021 | .......... A01D 34/416 |
| CN | 216399524 U | 4/2022 |
| DE | 559014 C | 9/1932 |
| DE | 585827 C | 10/1933 |
| DE | 606258 C | 11/1934 |
| DE | 632687 C | 7/1936 |
| DE | 1024279 B | 2/1958 |
| DE | 1057371 B | 5/1959 |
| DE | 1837331 U | 9/1961 |
| DE | 2000740 A1 | 8/1971 |
| DE | 2145899 A1 | 3/1972 |
| DE | 2618842 A1 | 11/1977 |
| DE | 3043175 A1 | 10/1982 |
| DE | 3300134 A1 | 7/1983 |
| DE | 8332487 U1 | 6/1985 |
| DE | 8625564 U1 | 12/1986 |
| DE | 8712938 U1 | 12/1987 |
| DE | 3728061 C1 | 7/1988 |
| DE | 9000712 U1 | 3/1990 |
| DE | 9002359 U1 | 5/1990 |
| DE | 9201863 U1 | 6/1992 |
| DE | 9410781 U1 | 11/1994 |
| DE | 4229823 C2 | 5/1995 |
| DE | 4344571 A1 | 6/1995 |
| DE | 19506497 A1 | 10/1996 |
| DE | 29611986 U1 | 10/1996 |
| DE | 19627715 A1 | 4/1998 |
| DE | 19905175 C2 | 11/2000 |
| DE | 10330649 A1 | 1/2005 |
| DE | 102004028912 A1 | 1/2006 |
| DE | 102004041914 A1 | 3/2006 |
| DE | 102005021467 A1 | 11/2006 |
| DE | 202006012391 U1 | 11/2006 |
| DE | 202010003187 U1 | 6/2010 |
| DE | 102007054278 B3 | 7/2010 |
| DE | 202012103230 U1 | 12/2013 |
| DE | 102014010692 A1 | 1/2016 |
| DE | 102015005488 A1 | 11/2016 |
| DE | 202017106599 U1 | 12/2017 |
| DE | 102017126467 A1 | 5/2019 |
| DE | 202020002176 U1 | 7/2020 |
| DE | 202020002177 U1 | 8/2020 |
| EP | 0051175 A1 | 5/1982 |
| EP | 0118315 A2 | 9/1984 |
| EP | 0053839 B1 | 10/1985 |
| EP | 0140989 B1 | 6/1987 |
| EP | 0293675 B1 | 7/1990 |
| EP | 0260643 B1 | 11/1991 |
| EP | 0512784 A1 | 11/1992 |
| EP | 0636307 A1 | 2/1995 |
| EP | 0472102 B1 | 3/1995 |
| EP | 0916242 A2 | 5/1999 |
| EP | 0737415 B1 | 7/1999 |
| EP | 1013158 A1 | 6/2000 |
| EP | 1048193 A1 | 11/2000 |
| EP | 0885553 B1 | 8/2001 |
| EP | 0972436 B1 | 1/2005 |
| EP | 1714537 A1 | 10/2006 |
| EP | 1080618 B1 | 12/2008 |
| EP | 2033507 B1 | 7/2011 |
| EP | 1816265 B1 | 12/2012 |
| EP | 2602504 B1 | 5/2014 |
| EP | 2995186 B1 | 3/2018 |
| EP | 3014975 B1 | 5/2018 |
| EP | 2404491 B1 | 11/2018 |
| EP | 3586607 A1 | 1/2020 |
| EP | 3646756 A1 | 5/2020 |
| JP | 2006020627 A | 1/2006 |
| KR | 101795453 B1 | 12/2017 |
| KR | 1020210053070 A | 5/2021 |
| WO | WO8400465 A1 | 2/1984 |
| WO | WO8803746 A1 | 6/1988 |
| WO | WO9607306 A1 | 3/1996 |
| WO | WO0003583 A2 | 1/2000 |
| WO | WO03011009 A1 | 2/2003 |
| WO | WO2004010766 A1 | 2/2004 |
| WO | WO2005001207 A1 | 1/2005 |
| WO | WO2005043977 A2 | 5/2005 |
| WO | 2005110685 A2 | 11/2005 |
| WO | WO2006061928 A1 | 6/2006 |
| WO | WO2010087970 A1 | 8/2010 |
| WO | WO2010100758 A1 | 9/2010 |
| WO | WO2011035930 A1 | 3/2011 |
| WO | WO2012034355 A1 | 3/2012 |
| WO | WO2012070736 A1 | 5/2012 |
| WO | WO2013125912 A1 | 8/2013 |
| WO | WO2013187812 A1 | 12/2013 |
| WO | WO2014073013 A2 | 5/2014 |
| WO | WO2014119116 A1 | 8/2014 |
| WO | WO2014119174 A1 | 8/2014 |
| WO | WO2014119175 A1 | 8/2014 |
| WO | WO2014119181 A1 | 8/2014 |
| WO | WO2015064291 A1 | 5/2015 |
| WO | WO2015107731 A1 | 7/2015 |
| WO | WO2015137110 A1 | 9/2015 |
| WO | WO2016143161 A1 | 9/2016 |
| WO | WO2017006981 A1 | 1/2017 |
| WO | WO2017046046 A1 | 3/2017 |
| WO | WO2017056591 A1 | 4/2017 |
| WO | 2018057428 A1 | 3/2018 |
| WO | WO2018059713 A1 | 4/2018 |
| WO | WO2018068324 A1 | 4/2018 |
| WO | WO2018154147 A1 | 8/2018 |
| WO | WO2018176295 A1 | 10/2018 |
| WO | WO2019154660 A1 | 8/2019 |

(56)                References Cited

FOREIGN PATENT DOCUMENTS

| WO | WO2019174863 | A1 | 9/2019 |
| WO | WO2019185123 | A1 | 10/2019 |
| WO | WO2019192201 | A1 | 10/2019 |
| WO | WO2019196677 | A1 | 10/2019 |
| WO | WO2020065329 | A1 | 4/2020 |

OTHER PUBLICATIONS

International Search Report and Written Opinion for Application No. PCT/US2022/035785 dated Oct. 21, 2022 (11 pages).
Ego, "Power+ 9.5″ Cultivator Attachment," <https://egopowerplus.com/multi-head-cultivator-attachment/> web page visited May 2, 2022.
Makita, "XRU17PT 36V (18V x2) LXT® Brushless String Trimmer Kit (5.0Ah)," <https://www.makitatools.com/products/details/XRU17PT> web page visited May 2, 2022.
Makita, "XUX01M5PT 36V (18V x2) LXT® Brushless Couple Shaft Power Head Kit with String Trimmer Attachment (5.0Ah)," <https://www.makitatools.com/products/details/XUX01M5PT> web page visited May 2, 2022.
Makita, "Couple Shaft Power Head and Attachments," <https://www.makitatools.com/ope/ope-shop/cordless-power-head> web page visited May 2, 2022.
Makita, "XUX01," Parts Breakdown, Rev. 0, Nov. 16, 2017 (6 pages).
Troy-Bilt, "Troy-Bilt Mini-Tiller," Owner/Operator Manual, © 1994 (24 pages).

* cited by examiner

STRING TRIMMER HEAD

CROSS-REFERENCE TO RELATED APPLICATIONS

This application claims priority to U.S. Provisional Patent Application No. 63/216,799, filed Jun. 30, 2021, the entire contents of which are incorporated herein by reference.

FIELD

The present disclosure relates to trimmers and, more particularly, to a string trimmer head.

BACKGROUND

Generally, trimmers are used to cut grass and weeds and are often used to edge around trees, near fences and walls, and along landscape borders. Conventional string trimmers include an elongated shaft with a rotating element or head near the end of the elongated shaft, and a spool or string head is attached to a gear head. Typically, the string head includes a monofilament line (i.e., trimmer line) rotated by the head for cutting and trimming along landscaped areas, fences, walls, etc.

SUMMARY

In one independent aspect, a trimmer head for use with a string trimmer including a drive shaft, the trimmer head including a housing rotatable about a rotational axis, the housing including a main body defining a cavity, and a cap removably coupled to the main body, a spool supported in the cavity and operable to support line to be dispensed, a retainer positioned between the housing and the spool, and a connection member positioned within the housing and configured to drivingly couple to the drive shaft.

In another independent aspect, a trimmer head for use with a string trimmer including a drive shaft, the trimmer head including a housing rotatable about a rotational axis, the housing including a main body defining a cavity, and a cap removably coupled to the main body, a spool supported in the cavity and operable to support line to be dispensed, a retainer positioned between the housing and the spool, and a weighted plate coupled to an end of the housing.

In yet another independent aspect, a string trimmer including a shaft, a handle positioned on the shaft and including a grip graspable by the user, a motor housing positioned on the shaft, a motor positioned within the motor housing and defining a drive shaft, and a trimmer head removably coupled to the drive shaft, the trimmer head including a housing defining a cavity and rotatable about a rotational axis, a spool supported in the cavity and operable to support line to be dispensed, and a connection member positioned within the housing and configured to drivingly couple to the drive shaft.

Other independent aspects of the disclosure may become apparent by consideration of the detailed description, claims, and accompanying drawings.

DETAILED DESCRIPTION

Before any independent embodiments of the disclosure are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Figure 1:
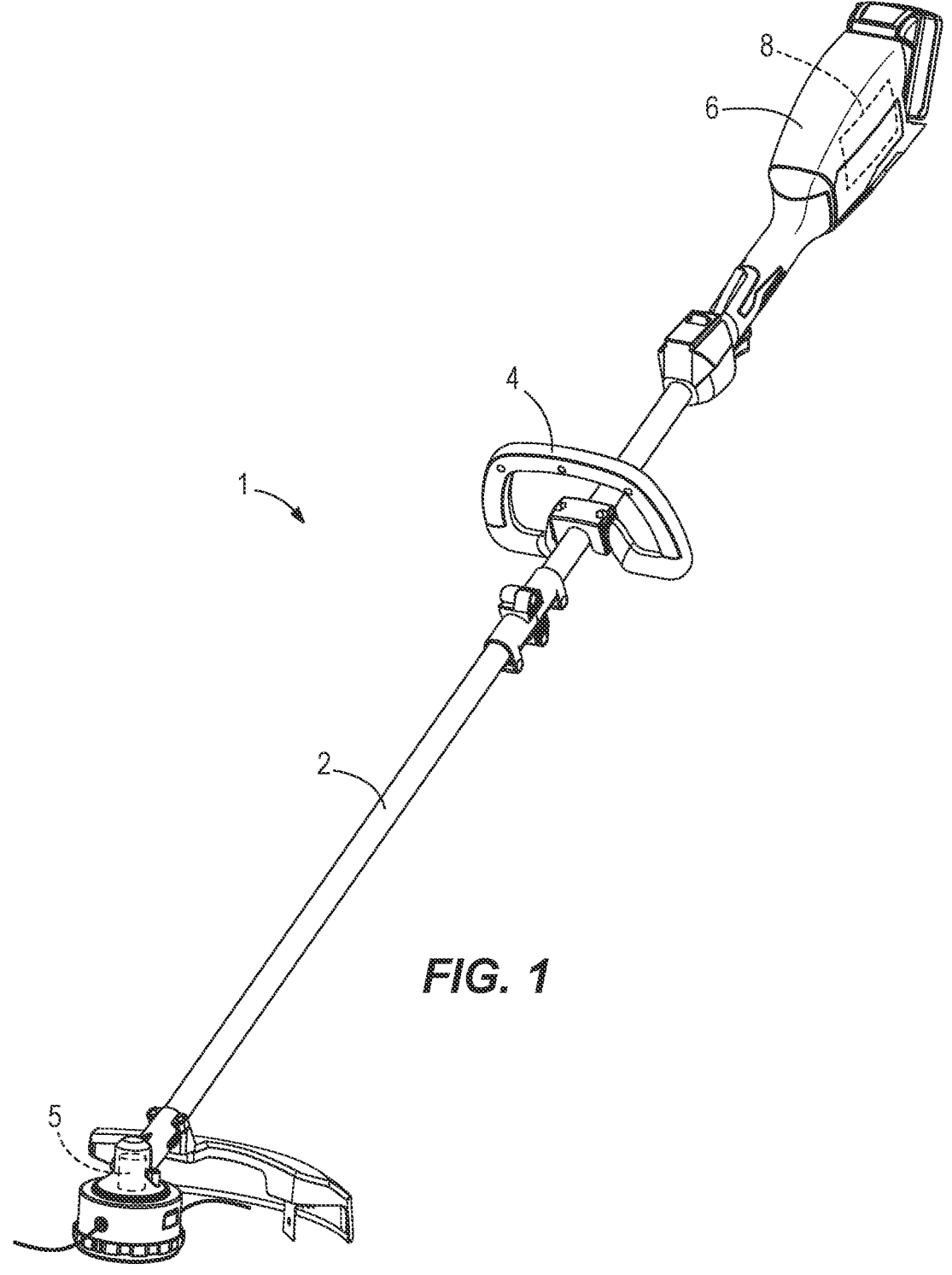
FIG. 1 is a perspective view of a string trimmer, according to embodiments disclosed herein.
Figure 2:
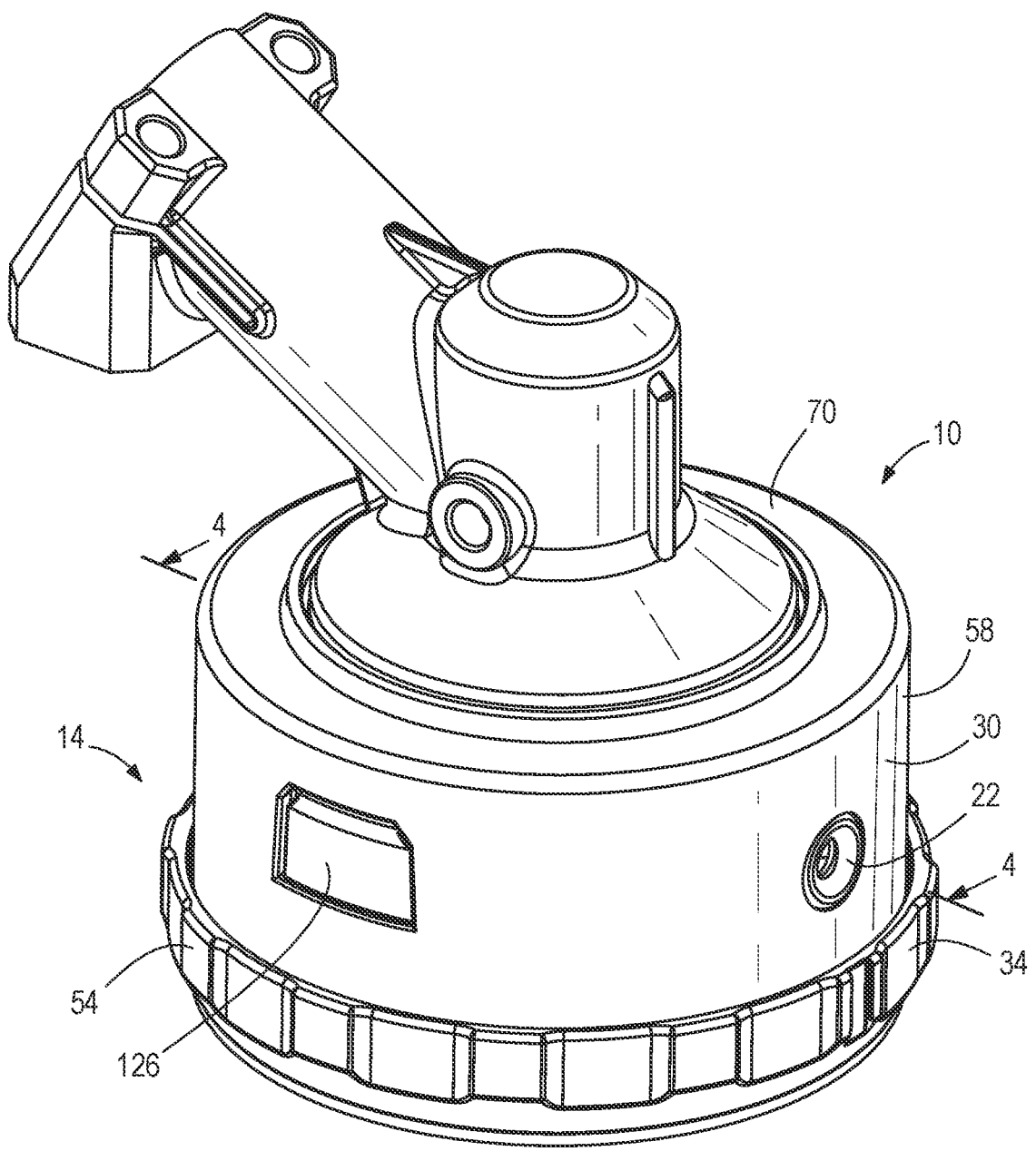
FIG. 2 is a perspective view of a trimmer head, according to embodiments disclosed herein.
Figure 3:
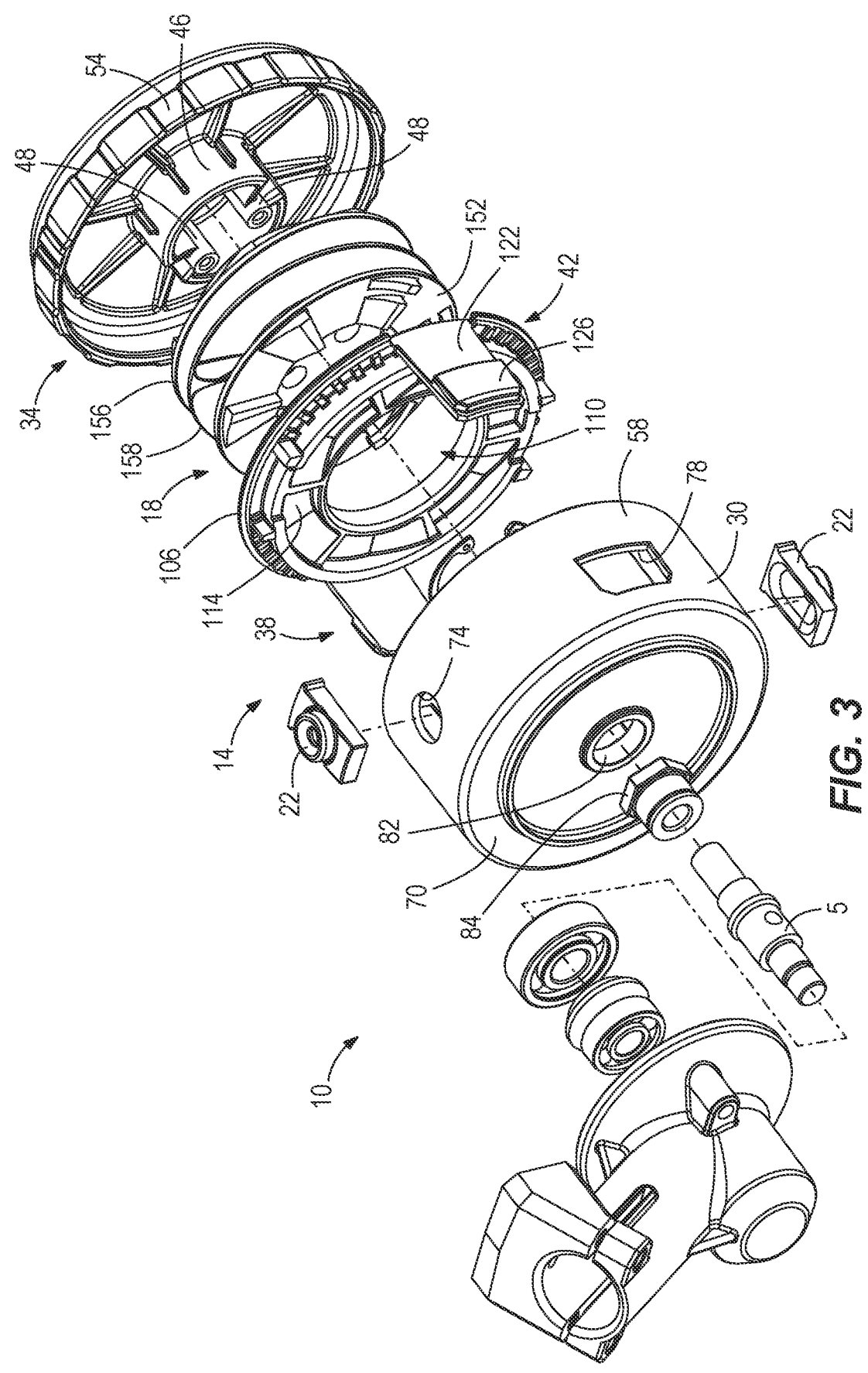
FIG. 3 is an exploded perspective view of the trimmer head of FIG. 1.
Figure 4:
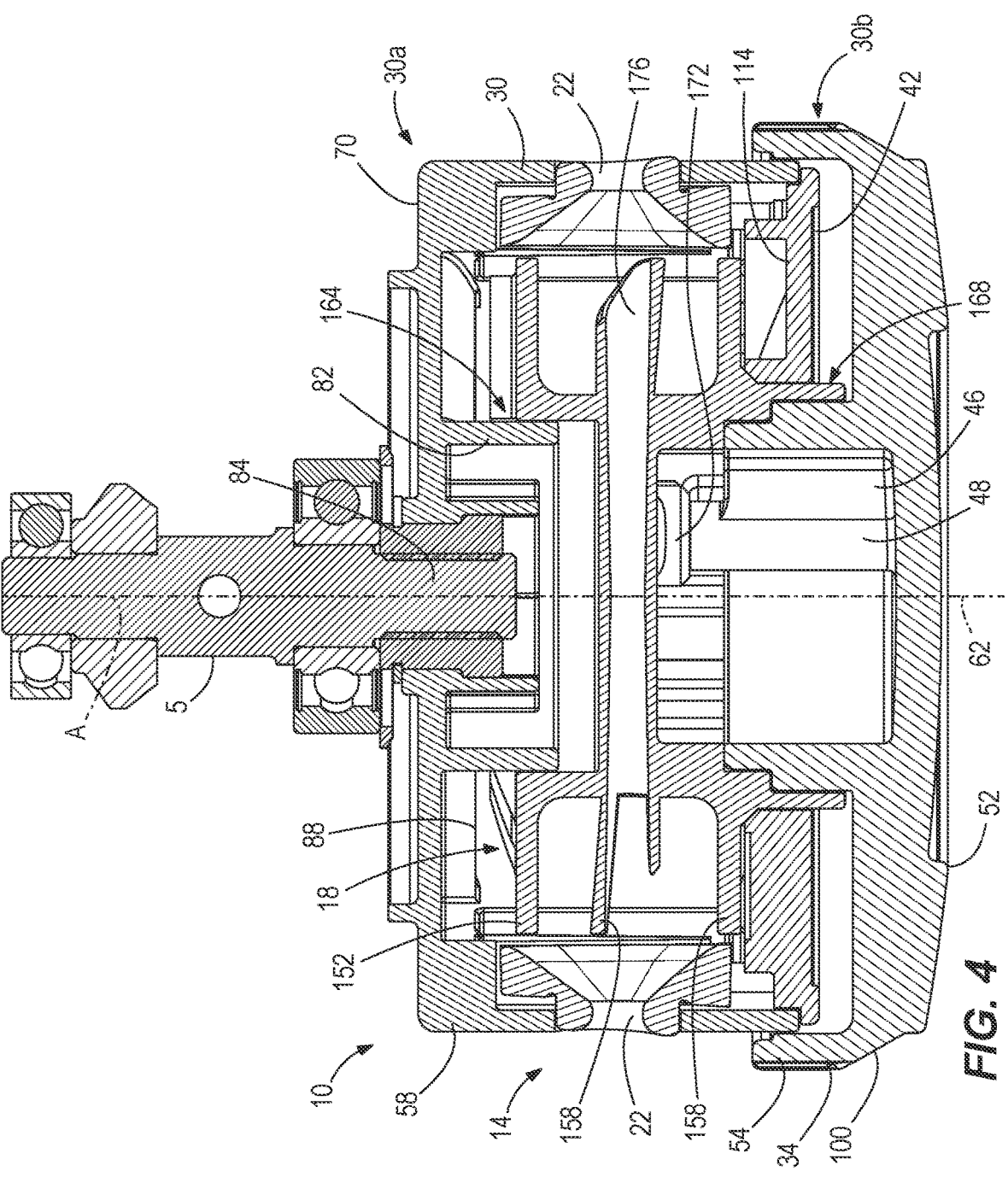
FIG. 4 is a cross-sectional elevation view of the trimmer head of FIG. 1.

FIGS. 2-4 illustrate a string trimmer head 10 for use on an exemplary string trimmer 1 (FIG. 1). Such a trimmer 1 generally includes a shaft 2 with a handle 4 toward one end and a motor housing 6 enclosing an electric motor 8 with a motor-driven output, or drive shaft, 5 for connection to a trimmer head 10 on the other end. Various powered trimmers (e.g., battery-powered, gas-powered, etc.) may be used with the trimmer head 10.

Returning to FIGS. 2-4, the illustrated trimmer head 10 includes a body 14 rotatable about an axis A (shown in FIG. 4) and supporting a spool 18 for retaining one or more lines (not shown). Line is wound around the spool 18 and extends through opposed eyelets 22 to cut vegetation (e.g., grass, weeds, etc.) The housing 14 includes a main body 30 drivingly connectable to the trimmer drive shaft 5 and a bottom plate 34 coupled to the spool 18. The main body 30 and the bottom plate 34 cooperate to define a cavity 38 for the spool 18. In the illustrated arrangement, the main body 30 and the bottom plate 34 are rotatably and axially fixed to the drive shaft 5. The housing is coupled to a retainer 42 so as to capture the spool 18 therebetween. The spool 18 is fixed to the bottom plate 34 such that the retainer 42 is captured therebetween. More specifically, the spool 18 and the bottom plate 34 are rotatably and axially fixed to each other and are movable relative to the main body 30 and the retainer 42.

The main body 30 is generally cylindrical and includes a first end 30a, a second end 30b opposite the first end 30a, and a longitudinal axis 62 extending from the first end 30a to the second end 30b. The main body 30 additionally includes a sidewall 58 and a base wall 70. The sidewall 58 defines a pair of eyelet openings 74 and a pair of retainer openings 78. The eyelet openings 74 are shaped and sized to receive the eyelets 22, and the retainer openings 78 are shaped and sized to receive at least a portion of the retainer 42. The base wall 70 includes a center boss 82 having a connection member 84 for connection to the trimmer drive shaft 5. A series of teeth 88 (FIG. 4) are positioned on an inner surface of the base wall 70 and are engageable with a corresponding series of teeth on the spool 18.

Figure 5:
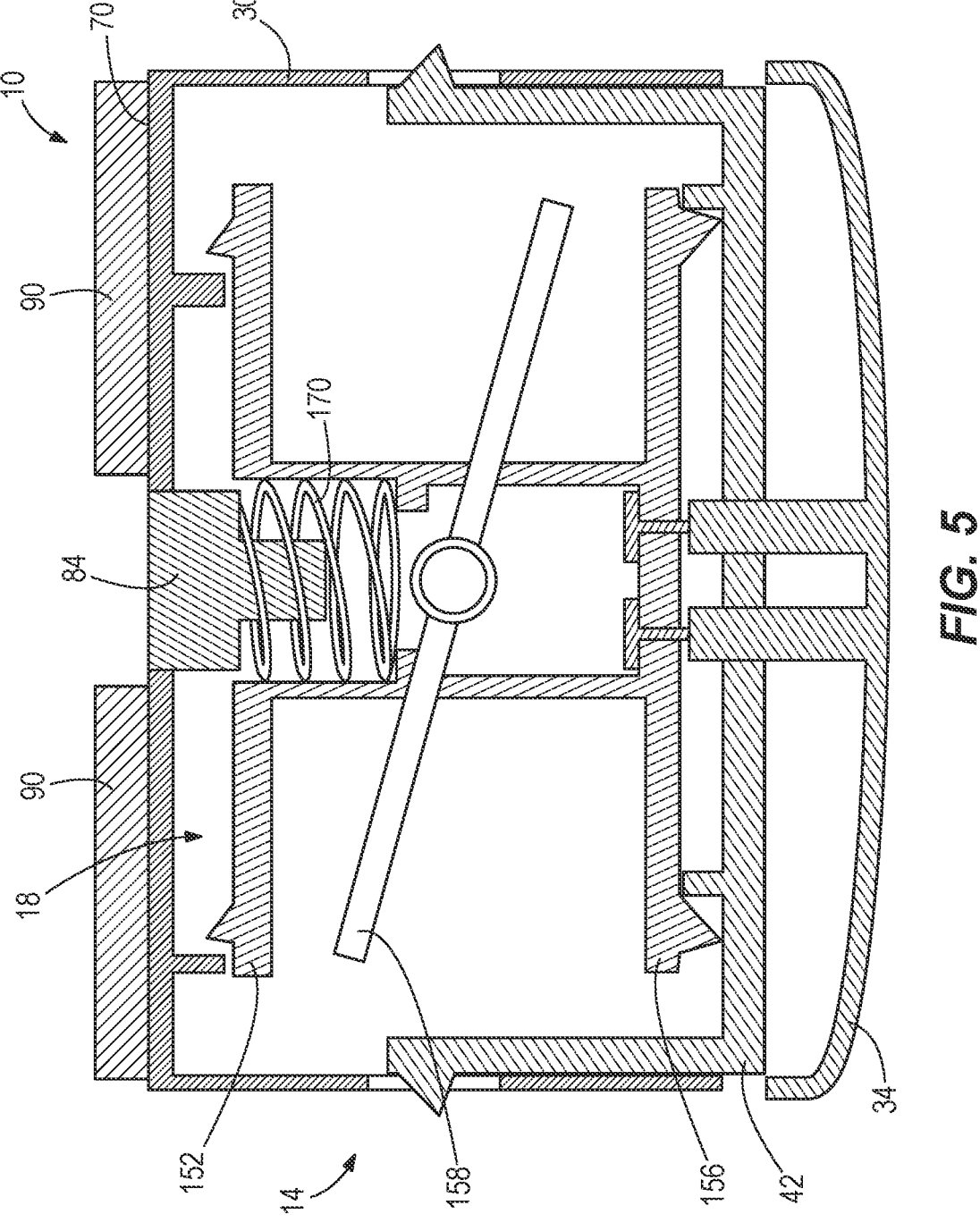
FIG. 5 is another cross-sectional elevation view of the trimmer head of FIG. 1, illustrating a vibration reduction mechanism.

With reference to FIG. 5, the main body 30 additionally includes one or more weighted plates 90. Specifically, the weighted plates 90 are coupled to the base wall 70 of the main body 30. The weighted plates 90 are coupled to the main body 30 adjacent to the longitudinal axis 62, thereby adding weight to the trimmer head 10 at a location close to the rotational axis A of the trimmer head 10. The plates 90 provide additional mass to the trimmer head 10, thereby reducing vibration and imbalance of the trimmer head 10 as it rotates. For example, during operation of the trimmer head 10, vibration may occur as a result of clearance between components of the trimmer head 10 (e.g., the main body 30, the retainer 42, the spool 18, etc.). The weighted plates 90 add mass to the main body 30, thereby reducing clearance between the components, minimizing vibration, and reducing the overall percentage of mass in the bottom plate 34.

The weighted plates 90 are generally rectangular and are composed of a metallic or other dense material (e.g., steel). However, the plates 90 may include alternative shapes and sizes and/or may be composed of alternative materials. For instance, in some embodiments, the plates 90 may be circular, triangular, or even annular in shape. In the illustrated embodiment, the plates 90 are illustrated on the trimmer head 10, which is a housing mounted trimmer head. However, the plates 90 may additionally or alternatively be positioned on a housing of a spool mounted trimmer head. The plates 90 may be permanently or removably affixed to a component of the trimmer head 10 in a variety of ways. In some embodiments, the plates 90 may be affixed to the trimmer head 10 by an adhesive. In other embodiments, the plates 90 may be affixed to the trimmer head 10 by one or more screws, bolts, clips, or the like. In embodiments with removable plates 90 affixed with, for instance, a contact adhesive or clips, the trimmer head 10 may be balanced rotatably about the rotational axis A similar to what is done for automotive wheels. Such embodiments may be able to account for manufacturing variations of components of the trimmer head 10 and/or may allow the end use to change the location of the one or more plates 90 according to the end user's preferences.

With reference to FIGS. 3-4, the retainer 42 includes a ring 106 defining a central opening 110. The retainer 42 includes a series of teeth 114 positioned on an upper surface of the ring 42. The teeth 114 are engageable with corresponding teeth positioned on the spool 18. Flexible retainer arms 122 extend from the ring 106, each having a retainer member 126 engageable in the associated retainer openings 78 to connect the main body 30 and the retainer 42.

The bottom plate 34 is generally cylindrical and includes a center boss 46 with one or more connecting projections 48. The bottom plate 34 includes an outer rim 54 and a main outer wall 52. The outer rim 54 of the bottom plate 34 covers an end of the sidewall 58 of the main body 30 to enclose the cavity 38.

With reference to FIG. 4, an edge 100 is formed on an outer surface of the bottom plate 34 at a junction between the outer rim 54 and the main outer wall 52. More specifically, the edge 100 is generally chamfered.

The main outer wall 52 includes wear rings. The wear rings are generally circular and protrude from the main outer wall 52. The wear rings are concentrically positioned on the main outer wall 52 relative to the longitudinal axis 62. The bottom plate 34 additionally includes ribs protruding from the main outer wall 52. The ribs include a thickness equal to the thickness of the wear rings.

As a user operates the string trimmer 1, the trimmer head 10 may be bumped against a work surface. However, the angle at which the trimmer head 10 is oriented relative to the work surface as it is "bumped" depends on the height of the user. For example, typically the main outer wall 52 is oriented within a range of 0-45 degrees relative to the work surface as it is bumped against the work surface. The wear rings and chamfered edge 100 prevent damage to the housing 14 of the trimmer head 10, regardless of the angle at which the main outer wall 52 is oriented relative to the work surface. Because the wear rings protrude from the main outer wall 52, as the trimmer head 10 is bumped against the ground, the wear rings contact the work surface rather than the outer rim 54 or main outer wall 52. As such, the bottom plate 34 is prevented from undergoing wear.

With reference to FIG. 4, the spool 18 includes a central body 130 having an upper recess 164 and a lower recess 168. The upper recess 164 slidingly receives the center boss 82 of the main body 30 and a biasing spring 170 (shown in FIG. 5). The biasing spring 170 is operable to bias the spool 18 downwardly away from the main body 30 to an initial position. The lower recess 168 includes a receptacle member 172 shaped and sized to interface with the connecting projections 48 of the bottom plate 34, thereby coupling the spool 18 to the bottom plate 34.

The spool 18 also includes a first, upper flange 152 extending around the upper recess 164, a second, lower flange 156 spaced apart from the lower recess 168, and a third, intermediate flange 158 dividing the cavity 38 into upper- and lower-line receptacles. A first series of teeth are formed on the upper flange 152 and are selectively engageable with the teeth 88' on the main body 30, and a second series of teeth are formed on the lower flange 156 and are selectively engageable with the teeth 114 on the retainer 42. In the biased, initial position of the spool 18, the second series of teeth engage the retainer teeth 114 to drivingly connect the spool 18 (and the bottom plate 34) with the retainer 42 (and the main body 30 and the trimmer drive shaft 5). The intermediate flange 158 defines a tube 176 for receiving the line. The tube 176 has opposing radial ends opening into the upper- and lower-line receptacles, respectively. In some embodiments, the spool 18 includes fewer or additional flanges. For example, in some embodiments, the spool 18 only includes the first flange 152 and the second flange 156. In still further embodiments, the spool 18 may be constructed without flanges.

To install line, the end of the single line is fed in one eyelet 22, into and through the tube 176. The end of the line is then fed in the other eyelet 22, such that an equal amount of line extends from each eyelet 22. The line is centered and then wound onto the spool 18 (e.g., by turning the bottom plate 34 in a direction opposite to a feed direction) until sufficient line extends from each eyelet 22.

In operation, the trimmer 1 is operated to rotate the drive shaft 5 and, thereby, the main body 30 (along with the retainer 42). In the biased, initial position, the second series of teeth engage the retainer teeth 114 to drivingly connect the spool 18, and the bottom plate 34, with the retainer 42 (and with the main body 30 and the trimmer drive shaft 5). As a result, the spool 18 and the line are rotated so that the line cuts vegetation.

As the trimmer head 10 is being operated, the head 10 may experience vibration, especially as it is "bumped" against the work surface. Because the wear rings are positioned on the main outer wall 52 of the bottom plate 34, the wear rings contact the work surface rather than the main outer wall 52. Therefore, the housing 14 is protected from wear against the ground. In the event that the user bumps the trimmer head 10 against the ground at an angle (e.g., the main outer wall 52 is oriented at an angle relative to the work surface), the chamfered edge 100 of the bottom plate 34 contacts the work surface rather than the outer rim 54 and/or the main outer wall 52, thereby protecting the housing 14 from wear.

Because the plates 90 are positioned on the base wall 70, mass is added to the main body 30, thereby reducing the impact of imbalances and vibration within the trimmer head 10. Additionally, because the plates 90 are positioned adjacent to the rotational axis A, vibration is reduced within the trimmer head 10 while the head 10 is spinning. The additional mass on the main body 30 also reduces the overall percent of mass in the bottom plate 34 in comparison to the rest of the trimmer head 10. Therefore, the mass is more evenly distributed within the trimmer head 10 in some embodiments. In other embodiments, the mass is distributed such that the trimmer head 10 is heavier near the connection point adjacent the drive shaft 5 and the base wall 70.

Although aspects of the invention have been described in detail with reference to certain preferred constructions, variations and modifications exist within the scope and spirit of one or more independent aspects of the invention as described.

What is claimed is:

1. A trimmer head for use with a string trimmer including a drive shaft, the trimmer head comprising:
   a housing rotatable about a rotational axis, the housing including a main body defining a cavity, and a cap removably coupled to the main body, wherein the main body comprises a base wall and a sidewall extending from an inner surface of the base wall;
   a spool supported in the cavity and operable to support a line to be dispensed;
   a retainer coupled to the housing and the spool, wherein at least a portion of the retainer is positioned between the spool and the cap;
   a connection member positioned within the housing and configured to drivingly couple to the drive shaft; and
   a plate removably coupled to an outer surface of the base wall opposite the inner surface, wherein the plate can be changed or adjusted plate positions or locations within an outer perimeter of the base wall, and wherein a longitudinal surface of the plate on the outer surface of the base wall is configured to provide additional mass to the trimmer head such that vibration and imbalance of the trimmer head is reduced.

2. The trimmer head of claim 1, wherein the housing includes a boss configured to receive the connection member.

3. The trimmer head of claim 1, further comprising a biasing member supported in the cavity adjacent the spool.

4. The trimmer head of claim 1, wherein the connection member is configured to rotatably and axially fix the main body and the cap to the drive shaft.

5. The trimmer head of claim 1, wherein the connection member is positioned in the base wall.

6. The trimmer head of claim 1, wherein:
   the cap comprises an outer wall and an outer rim extending from the outer wall; and
   wear rings are coupled to the outer wall about the rotational axis.

7. A trimmer head for use with a string trimmer, the trimmer head comprising:
   a housing rotatable about a rotational axis, the housing including a main body defining a cavity, and a cap removably coupled to the main body, wherein the main body comprises a base wall and a sidewall extending from an inner surface of the base wall;
   a spool supported in the cavity and operable to support a line to be dispensed;
   a retainer coupled to the housing and the spool, wherein at least a portion of the retainer is positioned between the spool and the cap; and a weighted plate coupled to an outer surface of the base wall opposite the inner surface, wherein the weight plate can be changed or adjusted plate positions or locations within an outer perimeter of the base wall, and wherein a longitudinal surface of the weighted plate on the outer surface of the base wall is configured to provide additional mass to the trimmer head such that vibration and imbalance of the trimmer head is reduced.

8. The trimmer head of claim 7, wherein the weighted plate is positioned adjacent to the rotational axis.

9. The trimmer head of claim 7, wherein the weighted plate is composed of a metallic material.

10. The trimmer head of claim 7, wherein the weighted plate is rectangular.

11. A string trimmer comprising:
   a shaft;
   a handle positioned on the shaft and including a grip graspable by a user;
   a motor housing positioned on the shaft;
   a motor positioned within the motor housing and defining a drive shaft; and
   a trimmer head removably coupled to the drive shaft, the trimmer head including:
      a housing rotatable about a rotational axis, the housing comprising a main body defining a cavity and a cap removably coupled to the main body, the main body comprising a base wall and a sidewall extending from an inner surface of the base wall,
      a spool supported in the cavity and operable to support a line to be dispensed,
      a connection member positioned within the housing and configured to drivingly couple to the drive shaft, and
      a weighted plate coupled to an outer surface of the base wall of the housing opposite the inner surface, wherein the weighted plate can be changed or adjusted plate positions or locations within an outer perimeter of the base wall, and wherein a longitudinal surface of the weighted plate on the outer surface of the base wall is configured to provide additional mass to the trimmer head such that vibration and imbalance of the trimmer head is reduced.

12. The string trimmer of claim 11, wherein the trimmer head includes a retainer coupled to the housing and the spool, wherein at least a portion of the retainer is positioned between the spool and the cap, wherein the retainer comprising a ring defining a central opening and retainer arms extending from the ring, and wherein the retainer arms engage retainer openings disposed in the main body of the housing for connecting the main body and the retainer.

13. The string trimmer of claim 11, wherein the trimmer head includes a biasing member supported in the cavity adjacent the spool.

14. The trimmer head of claim 11, wherein the housing includes a boss configured to receive the connection member.

15. The trimmer head of claim 11, wherein the connection member is configured to rotatably and axially fix the main body and the cap to the drive shaft.

16. The trimmer head of claim 11, wherein the connection member is positioned in the base wall.

* * * * *